United States Patent
Sakata et al.

[11] Patent Number: 6,021,864
[45] Date of Patent: Feb. 8, 2000

[54] SERVO VALVE FOR POWER ASSISTED STEERING GEAR

[75] Inventors: Takatoshi Sakata, Yamatotakada; Masahide Nakamura; Osamu Sano, both of Kashihara, all of Japan

[73] Assignee: Koyo Seiko Co., Ltd., Osaka, Japan

[21] Appl. No.: 08/935,862

[22] Filed: Sep. 23, 1997

[30] Foreign Application Priority Data

Jun. 11, 1997 [JP] Japan ................................. 9-153783

[51] Int. Cl.⁷ .................... B62D 5/06; B62D 5/22
[52] U.S. Cl. .................. 180/417; 180/426; 267/273; 74/388 PS
[58] Field of Search ................... 180/417, 425, 180/426, 428; 267/273; 91/375 A; 74/388 PS

[56] References Cited

U.S. PATENT DOCUMENTS

| | | | |
|---|---|---|---|
| 4,651,622 | 3/1987 | Yoshida | 91/370 |
| 4,769,715 | 9/1988 | Futaba et al. | 180/143 |
| 4,774,847 | 10/1988 | Breitweg | 74/388 PS |
| 5,233,906 | 8/1993 | Bishop et al. | 91/375 A |
| 5,571,238 | 11/1996 | Breitweg et al. | 91/375 A |
| 5,687,810 | 11/1997 | Choi et al. | 180/423 |
| 5,707,049 | 1/1998 | Dodak | 267/273 |
| 5,851,006 | 12/1998 | Spillner et al. | 267/273 |

FOREIGN PATENT DOCUMENTS

| | | |
|---|---|---|
| 53-41851 | 11/1978 | Japan . |
| 61-41787 | 9/1986 | Japan . |
| WO 97/00189 | 1/1997 | WIPO . |

*Primary Examiner*—J. J. Swann
*Assistant Examiner*—Christopher Bottorff
*Attorney, Agent, or Firm*—Rabin & Champagne, PC

[57] ABSTRACT

A servo valve for a power assisted steering gear for producing an auxiliary steering force corresponding to twist between an input member and an output member which are connected to each other by a torsion bar is disclosed. There is provided a sleeve member surrounding a torsion bar and having first and second ends. The first end is prevented from being rotated with respect to the torsion bar. The second end is provided with an opening extending along the radius of the sleeve member. A plunger-containing hole extending in the radial direction is formed in an intermediate part between opposite ends of the torsion bar, and plungers are contained in the containing hole which are movable forward and backward. The plungers are urged forward by a helical compression spring interposed between the plungers. Each of the urged plungers is engaged with an edge of the opening serving as a holding arrangement, to increase the torsional rigidity of the torsion bar at the time when the valve is neutral.

20 Claims, 12 Drawing Sheets

F I G. 3
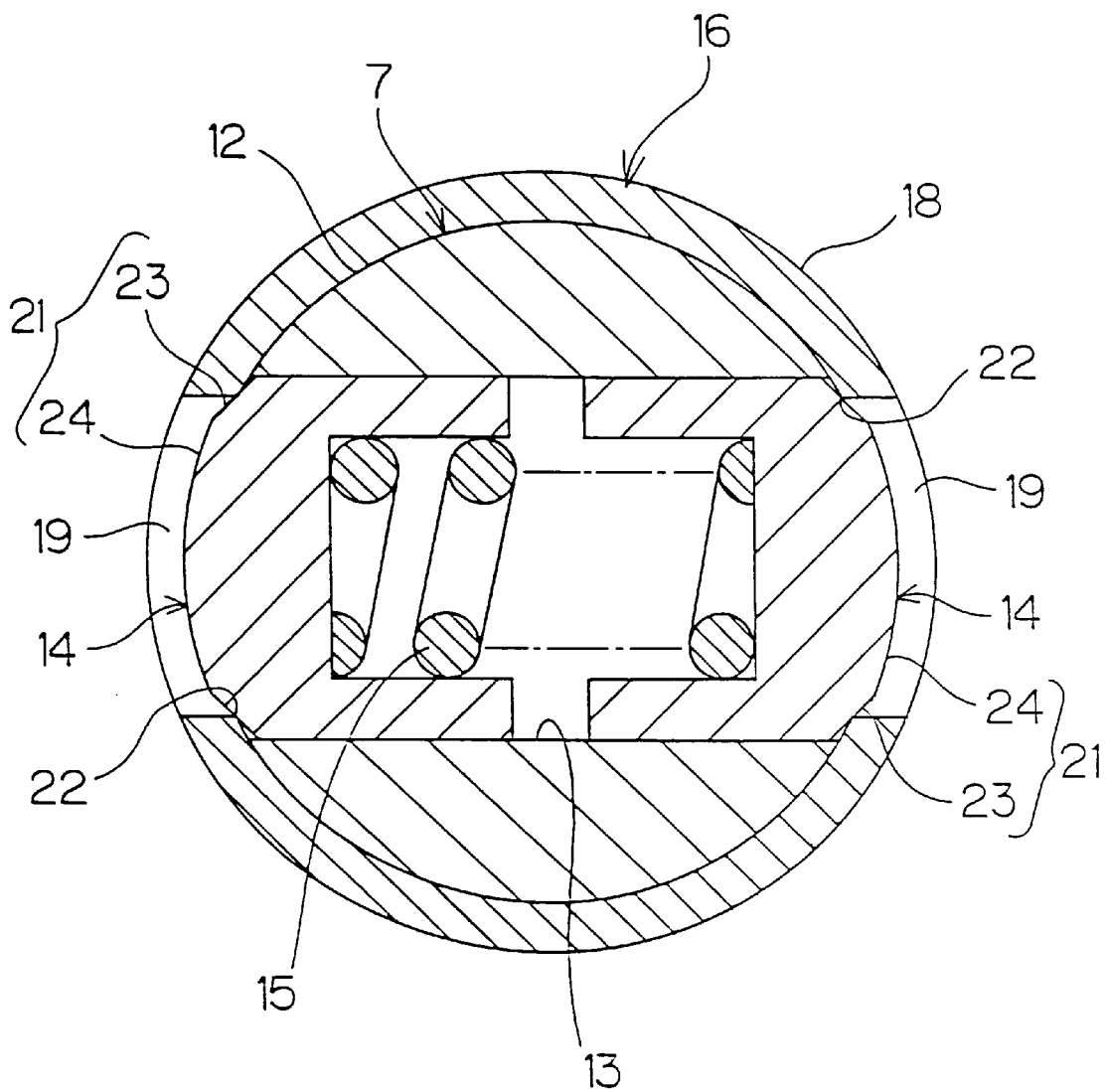

F I G. 11
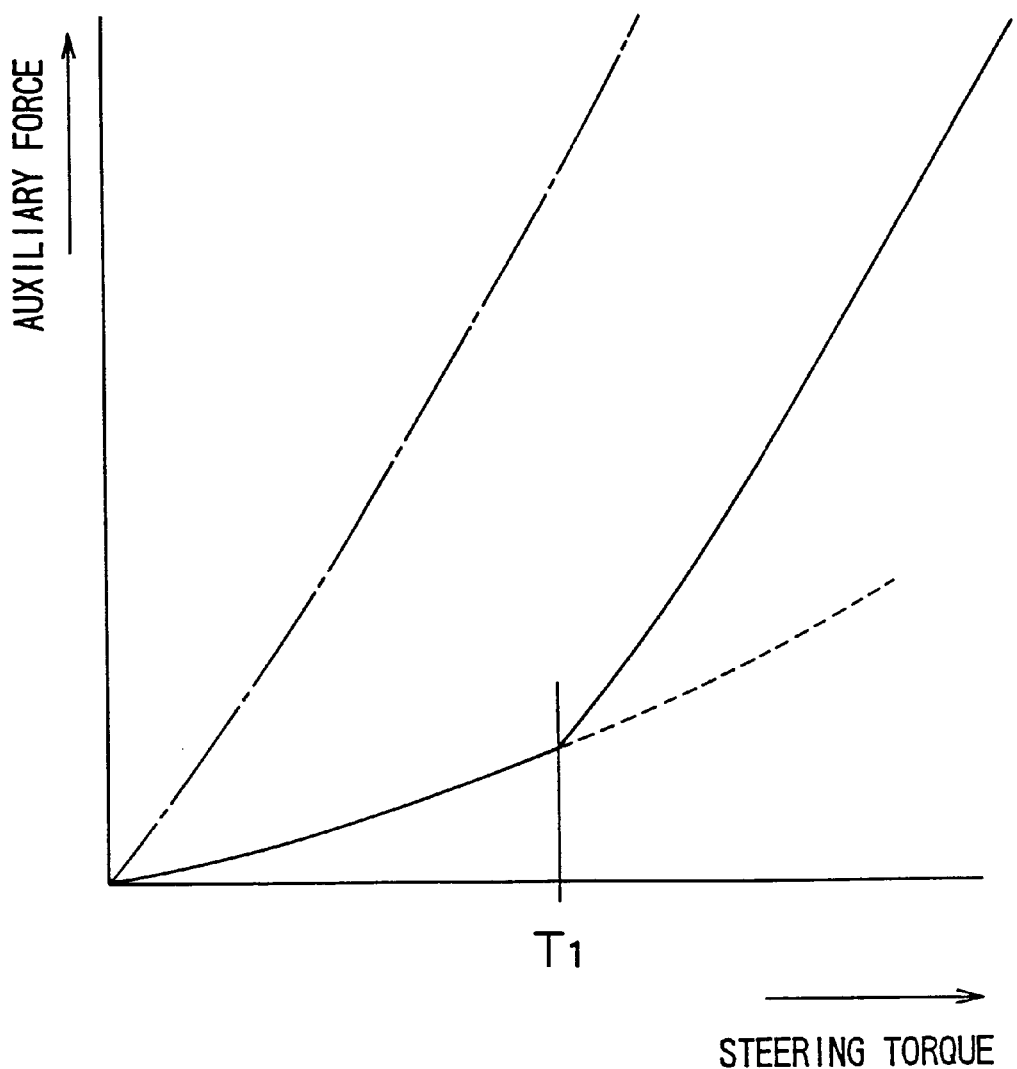

SERVO VALVE FOR POWER ASSISTED STEERING GEAR

CROSS REFERENCE TO RELATED APPLICATION

This application claims priority benefits under 35 USC §119 of Japanese Patent Application Serial No. 9-153783, the disclosure of which is incorporated by reference.

BACKGROUND OF THE INVENTION

1. Field of the Invention

The present invention relates to a servo valve for a power assisted steering gear in which an input shaft and an output shaft are connected to each other through a torsion bar.

2. Description of Related Art

In a servo valve for this type of power assisted steering gear, an input shaft is connected to a steering wheel operated by an operator. An output shaft is connected to a wheel of a vehicle through a rack-and-pinion mechanism, for example. The input shaft and output shaft are connected to each other through a torsion bar.

When steering, a flow path of pressure oil is switched depending on a relative displacement between the input shaft and the output shaft which is produced when the torsion bar is twisted. The switching of the flow path causes the pressure oil to be fed and discharged to and from a power cylinder, to obtain an auxiliary steering force.

On the other hand, when in a non-steering condition (that is, when traveling straight where the servo valve is in its neutral state), the torsion bar is hardly twisted by an operating force from the input shaft. However, a slight force from the wheel, for example, a force due to vibration or the like generated by irregularities in a road surface, or unbalance or the like between tires may, in some cases, be transmitted from the output shaft, so that the torsion bar is slightly twisted. A twist thus produced may make the travel direction unstable because it slightly operates the servo valve.

There has been conventionally provided a servo valve for a power assisted steering gear so adapted that in order to increase steering rigidity in its neutral state, there is provided a plunger the penetrates an input shaft in the radial direction. The plunger is pressed against an intermediate part in the axial direction of the torsion bar by oil pressure from the exterior, depending on the traveling state (see Japanese Patent Publication No. 41851/1978 and Japanese Patent Publication No. 41787/1986, for example).

However, a hydraulic mechanism for loading hydraulic oil pressure into the plunger, a mechanism for controlling operations performed by the hydraulic mechanism depending on the traveling state, and the like are required. Therefore, the construction is considerably complicated, and a large space is required, so that the servo valve is increased in size.

SUMMARY OF THE INVENTION

An object of the present invention is to provide a servo valve for a power assisted steering gear which can ensure steering rigidity in its neutral state without being increased in size, while maintaining a simple construction.

In order to attain the above-mentioned object, in a preferred mode of the present invention, there is provided a servo valve comprising an input member, an output member, a torsion bar having opposite ends respectively connected to the input member and the output member, a sleeve member surrounding the torsion bar and having first and second ends, and means for preventing the first end of the sleeve member from being rotated with respect to the torsion bar, the second end of the sleeve member being provided with means for holding an intermediate part between the opposite ends of the torsion bar in order to increase the effective torsional rigidity of the torsion bar in a predetermined torsional angle range of the torsion bar.

In this mode, the intermediate part of the torsion bar is held by the holding means, whereby the torsional rigidity of the torsion bar can be increased by decreasing the effective length relating to the twist of the torsion bar. Consequently, steering rigidity at the time of non-steering when the torsion bar is within a predetermined torsional angle range, that is, at the time when the valve is neutral.

Moreover, the holding means for increasing the torsional rigidity of the torsion bar is provided in the sleeve member surrounding the torsion bar, whereby a desired steering performance can be achieved without increasing a power assisted steering gear in size. Further, the sleeve member is fixed to the torsion bar, whereby the torsion bar and the sleeve member can be easily formed as a unit.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a cross-sectional view taken along a line III—III shown in FIG. 2;

FIG. 11 is a graph showing one example of the characteristics of an auxiliary force obtained in the power assisted steering gear comprising the servo valve according to the fourth embodiment.

DETAILED DESCRIPTION OF THE PREFERRED EMBODIMENT

Preferred embodiments of the present invention will be described on the basis of drawings.

Figure 1:
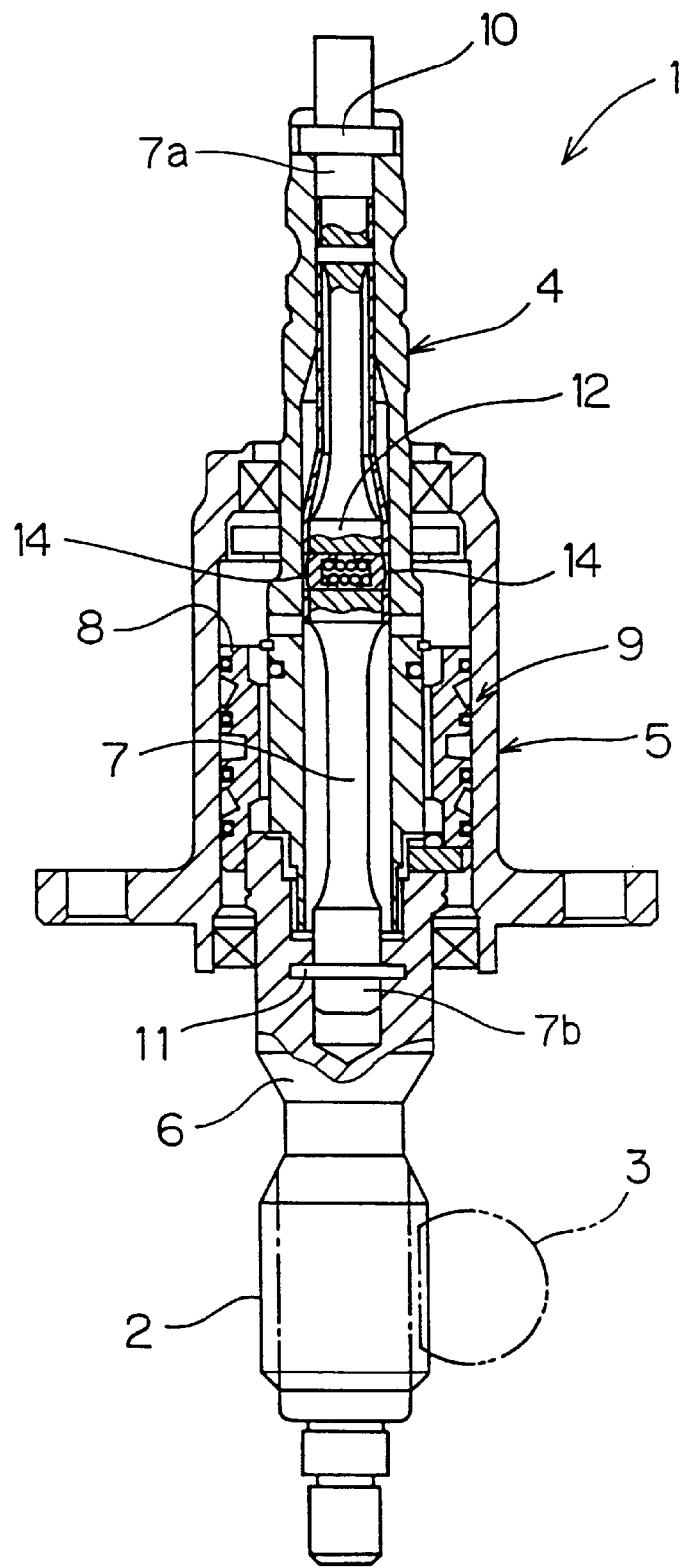
FIG. 1 is a schematic sectional view showing the internal construction of a servo valve for a power assisted steering gear according to a first embodiment of the present invention.

Referring to FIGS. 1 to 5, a servo valve for a power assisted steering gear according to one embodiment of the present invention will be described. Referring to FIG. 1, the servo valve 1 is applied to a power assisted steering gear of a rack-and-pinion type, comprising a rack bar 3 driven by a pinion 2. A handle is connected to a cylindrical input shaft 4 through a steering column (not shown).

The rack bar 3 is also used as a piston rod of a power cylinder serving as a hydraulic actuator for producing an auxiliary steering force. Tie rods (not shown) are connected to both ends of the piston rod. An operating force from a steering wheel (not shown) which is applied to the input shaft 4 is transmitted to the pinion 2, and the tie rods change the direction of the steering wheel (not shown) through the rack bar 3 by the rotation of the pinion 2.

The input shaft 4 and an output shaft 6 in which the pinion 2 is formed are rotatably supported through bearings (not shown) in a housing 5. The input shaft 4 and the output shaft 6 are connected relatively rotatably to each other by a torsion bar 7. With respect to the housing 5, only an upper housing containing the input shaft 4 is illustrated. The illustration of a lower housing containing the pinion 2 is omitted.

Figure 2:
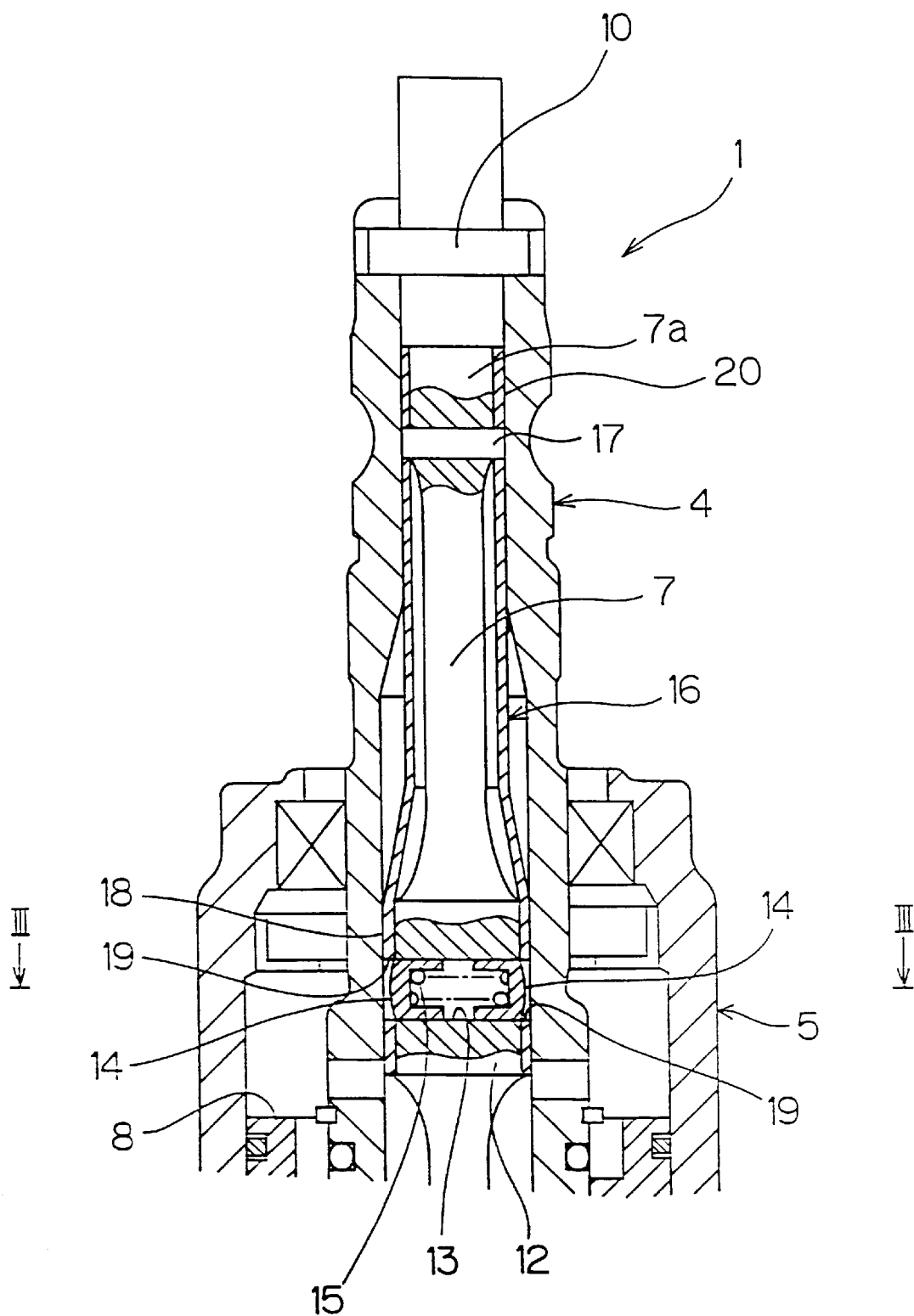
FIG. 2 is an enlarged view of a principal part of FIG. 1.

Referring to FIG. 2 which is an enlarged view of a principal part of FIG. 1, constructed is a known rotary valve mechanism 9 in which the cylindrical input shaft 4 is surrounded by a valve sleeve 8 connected integrally rotatably to the output shaft 6. The input shaft 4 and the valve sleeve 8 are provided with grooves and oil paths, to produce an auxiliary steering force upon feeding and discharging pressure oil from a pressure source such as a pump to and from a pair of oil chambers of a power cylinder. In the valve mechanism 9, the input shaft 4 and the valve sleeve 8 are relatively rotated at the time of steering, so that a flow path is controlled, to feed and discharge the pressure oil to and from the power cylinder, while returning the pressure oil to a reservoir tank, for example, at the time of non-steering.

Opposite ends 7a and 7b of the torsion bar 7 are respectively connected integrally rotatably to the input shaft 4 and the output shaft 6 by a pin 10 and a pin 11. Further, the torsion bar 7 is provided with a large diameter portion 12 serving as an intermediate part along its axis. A plunger containing hole 13, containing a pair of plungers 14 that are movable forwards and backwards, is formed upon penetrating the large diameter portion 12 in the radial direction. The plungers 14 are arranged in opposite directions, and a helical compression spring 15 is interposed therebetween. Both the plungers 14 are for increasing the torsional rigidity of the torsion bar 7 upon connecting the large diameter portion 12 to the input shaft 4 through a torsion bar case 16 serving as a sleeve member as described later.

On the other hand, a region from the end 7a fixed to the input shaft 4 to the large diameter portion 12 serving as an intermediate part is covered with the torsion bar case 16 serving as a sleeve member. The torsion bar case 16 has a fixed portion 20 serving as a first end fixed to the fixed end 7a of the torsion bar 7 by a pin 17. Consequently, the torsion bar case 16 is rotated substantially integrally with the input shaft 4. In the fixed portion 20, connection strength can be also improved by subjecting the outer periphery of the torsion bar 7 to brazing, for example.

Referring to FIGS. 2 and 3, the torsion bar case 16 has an enlarged diameter portion 18 serving as a second end along the periphery of the large diameter portion 12, and the pair of plungers 14 and a pair of openings 19 engaged therewith are formed upon penetrating the enlarged diameter portion 18. The openings 19 are formed in positions where the plungers 14 can be engaged therewith at the time of non-steering, that is, when the valve is in its neutral state. Further, each of the openings 19 has such dimensions as to prevent the plunger 14 from being extracted from the plunger containing hole 13. That is, the diameter of the opening 19 is made smaller than the diameter of the plunger containing hole 13.

As the torsion bar case 16, a product obtained by pressing a general carbon steel tube for piping, for example, can be used at low cost.

The plunger 14 is composed of a cylindrical member into which at least a part of the helical compression spring 15 is inserted, its apex 21 being engaged with an edge 22 which serves as an engaging portion of the opening 19. The apex 21 of the plunger 14 comprises a conical surface portion 23 engaged with the edge 22 of the opening 19 and a spherical surface portion 24 connecting with the tip of the conical surface portion 23. The inclined conical surface portion 23 of the plunger 14 urged by the helical compression spring 15 is engaged with the edge 22 of the opening 19, so that a cam-shaped effect is obtained to hold the plunger 14 in the center of the opening 19. An angle in the range of 35° to 55°, for example, particularly an angle of 45° is preferable as the angle of inclination of the conical surface portion 23.

Construction for increasing the torsional rigidity of the torsion bar 7 will be expressed in different words. The edges 22 of the openings 19 in the torsion bar case 16 hold the large diameter portion 12 serving as an intermediate part of the torsion bar 7 through the plungers 14, whereby the edges 22 of the openings 19 constitute holding means.

The apex 21 of the plunger 14 avoids contact with an inner peripheral surface of the input shaft 4 in a state where it is engaged with the edge 22 of the opening 19. The reason is for eliminating deviation between input torque and torque at the reaction time, that is, hysteresis. Further, it is preferable in improving durability that the apex 21 of the plunger 14 is subjected to hardening.

Further, since the hardness of the apex of the plunger 14 is superior than that of the torsion bar case 16, the contact angles between the apex 21 and the torsion bar case 16 are conserved even when the torsion bar case 16 is worn because of a long-term use, thereby making it possible to maintain a substantially constant displacement point of a torsional torque (which is to be described later).

According to the present embodiment, the following superior advantages are provided.

The plunger 14 urged by the helical compression spring 15 at the time of non-steering (at the time of straight traveling) is engaged with the edge 22 of the opening 19 to connect the intermediate part of the torsion bar 7 and the torsion bar case 16 to each other. Consequently, the torsional rigidity of the torsion bar 7 can be increased by decreasing the effective length relating to the twist of the torsion bar 7. Consequently, it is possible to increase the steering rigidity at the time of non-steering, that is, at the time when the valve is neutral.

Moreover, a mechanism for increasing the torsional rigidity of the torsion bar 7 can be incorporated into the torsion bar 7 itself in such simple construction that the plunger 14 which contains a spring. Consequently, a desired steering performance can be achieved without increasing the servo valve 1 in size.

Since an engaging portion for engaging the plunger 14 is constituted by the opening 19 formed in the torsion bar case 16, processing is significantly simplified. The reason for this is that the torsion bar case 16 before being incorporated into the input shaft 4 may be subjected to perforation processing in the radial direction to form the opening 19, so that the processing becomes much simpler, as compared with that where the inner peripheral surface of the input shaft 4 is directly subjected to processing.

Furthermore, the torsion bar 7 incorporating the helical compression spring 15 and the plungers 14 is covered with the torsion case bar 16 to form a unit, whereby the servo valve 1 is easily assembled. As a result, the fabrication cost thereof can be reduced.

Figure 4:
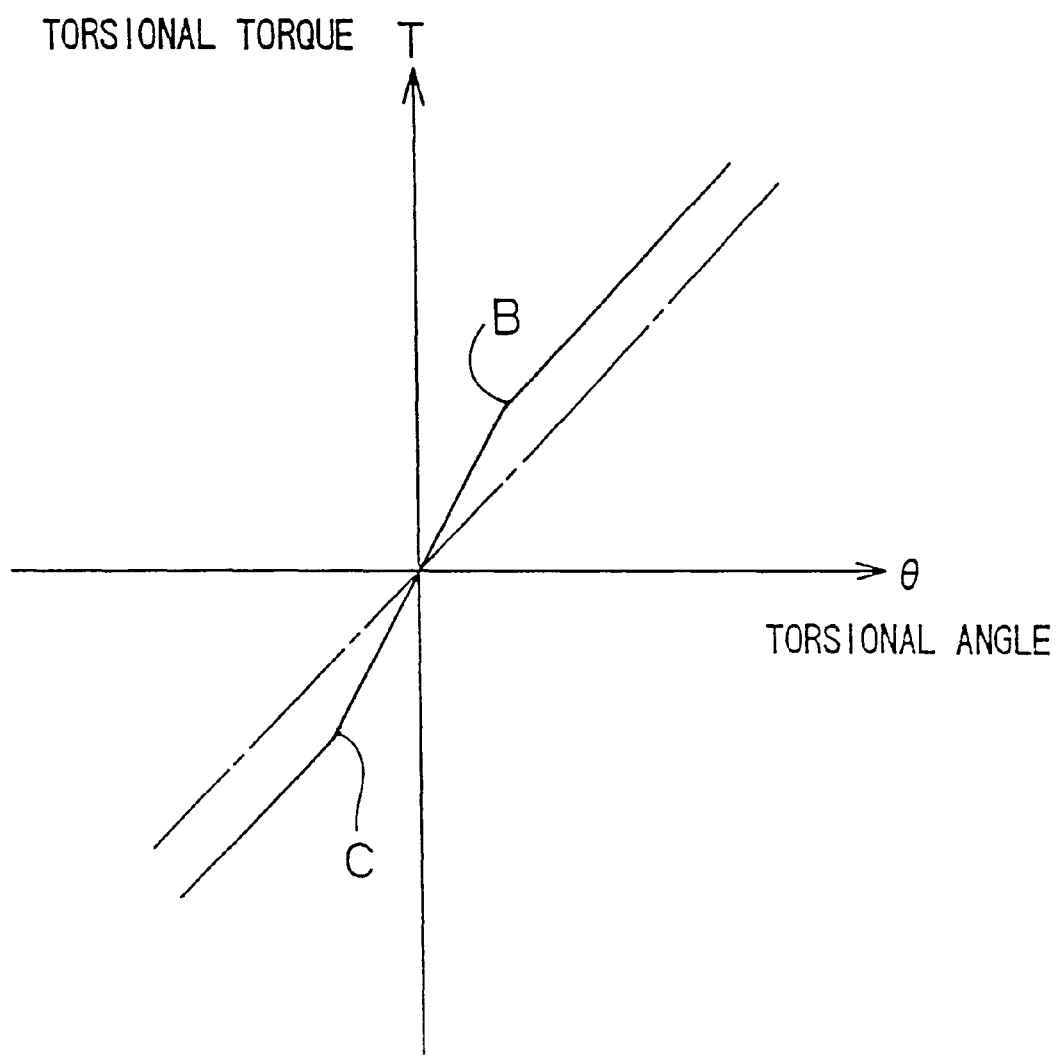
FIG. 4 is a graph showing the relationship between a torsional angle and torsional torque of a torsion bar.

Since the helical compression spring 15 is inserted into the cylindrical plunger 14, a sufficient length can be ensured as the set length of the helical compression spring 15 even if the diameter of the plunger containing hole 13 is increased to the vicinity of the limit of the torsional stress of the torsion bar 7. As a result, the set load can be increased upon ensuring a large line diameter and a large amount of deflection as the line diameter and the amount of deflection of the helical compression spring 15. Consequently, displacement points B and C of the torsional torque T of the torsion bar 7 can be set in a region where the torsional angle θ of the torsion bar 7 is larger, as shown in FIG. 4.

Furthermore, the paired plungers 14 are operated in opposite directions by the single helical compression spring 15, whereby the torsion bar 7 does not unnecessarily bend.

Figure 5:
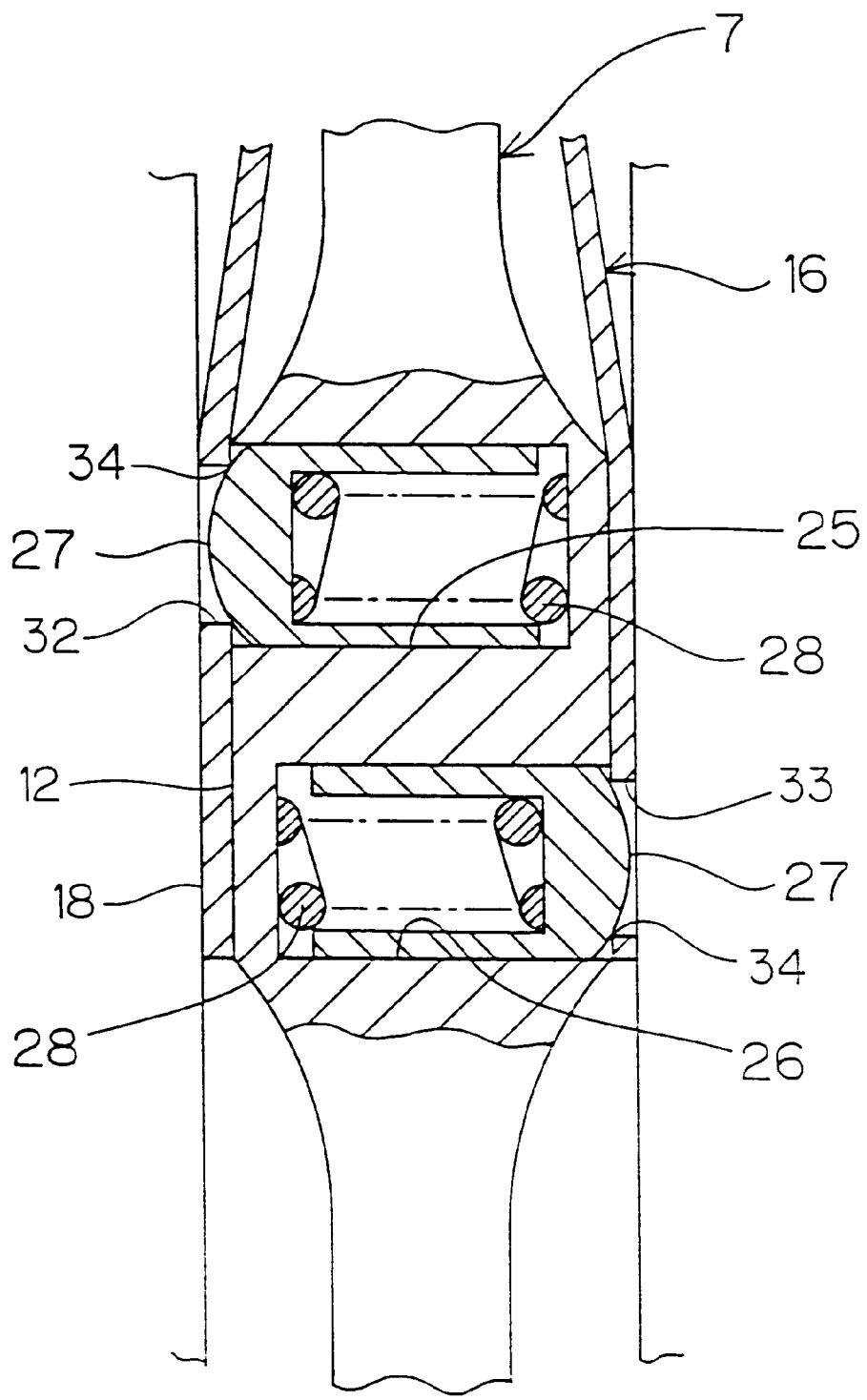
FIG. 5 is a cross-sectional view of a principal part of a servo valve for a power assisted steering gear according to a second embodiment of the present invention.

FIG. 5 illustrates a principal part of a second embodiment of the present invention. Referring to FIG. 5, in the present invention, paired plunger containing holes 25 and 26 extending in the radial direction are provided side by side along the axis of a torsion bar 7, and a single plunger 27 and a single helical compression spring 28 are contained in each of the plunger containing holes 25 and 26. The paired plunger containing holes 25 and 26 are so formed as to have predetermined depths in opposite directions, and both the plungers 27 are urged in opposite directions by the corresponding helical compression springs 28.

In the present embodiment, a set load which is twice that in a case where a single helical compression spring is used is obtained because two helical compression springs 28 are used in parallel besides producing the same function and effect as those in the embodiment shown in FIG. 1. As a result, it is possible to further improve steering rigidity at the time when a valve is in its neutral state.

In the above-mentioned first and second embodiments, it is possible to also use a ball plunger.

Although, in the above-mentioned first and second embodiments, the plungers 14 and 27 are not respectively brought into contact with the inner peripheral surfaces of the input shafts 4, they may be brought into contact therewith. Further, a recess engaging the plunger may be directly formed on the inner peripheral surface of the input shaft 4.

Figure 6:
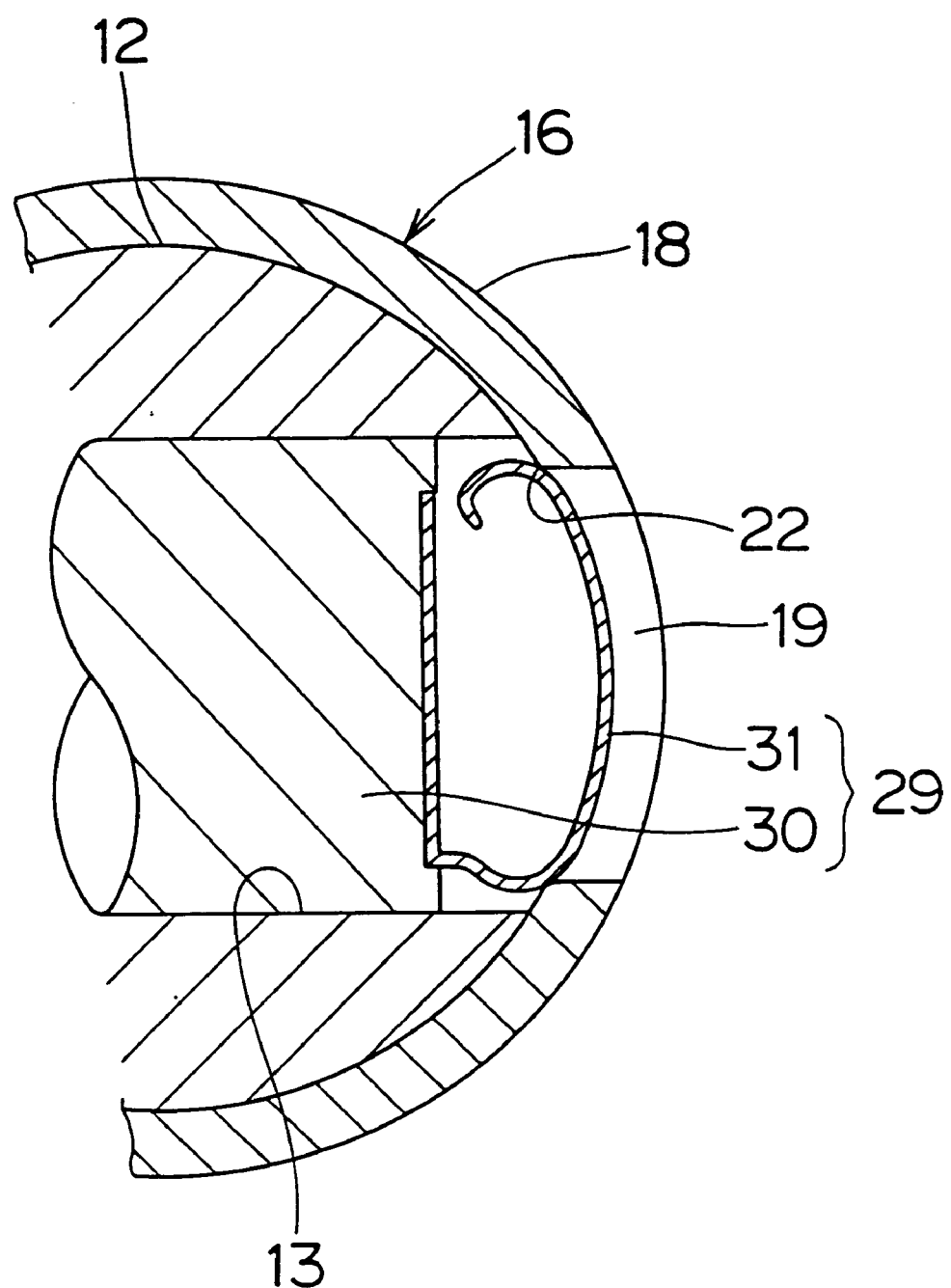
FIG. 6 is a cross-sectional view of a principal part of a servo valve for a power assisted steering gear according to a third embodiment of the present invention.

FIG. 6 illustrates a third embodiment. The present embodiment is characterized in that a plunger itself has elasticity. A plunger 29 comprises a main body portion 30 held in a plunger containing hole 13 and a projected surface-shaped plate spring 31 fixed to an end surface of the main body portion 30. In the plunger 29, its apex is constituted by the plate spring 31, and the plate spring 31 is elastically engaged with an opening 19 in a torsion bar case 16 serving as a sleeve member.

Description is now made of a servo valve for a power assisted steering gear according to a fourth embodiment of the present invention.

Figure 7:
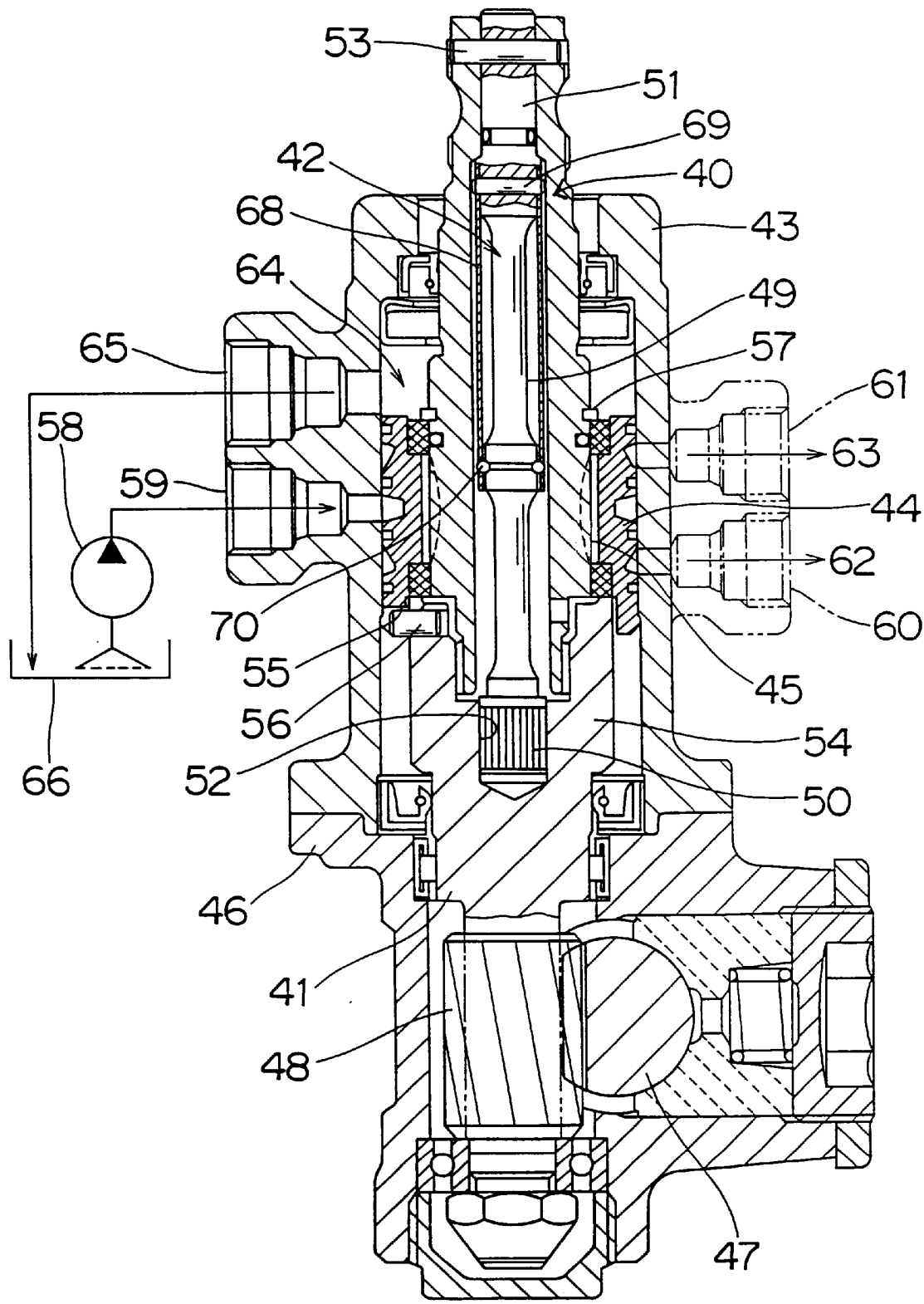
FIG. 7 is a schematic sectional view showing the internal construction of a servo valve for a power assisted steering gear according to a fourth embodiment of the present invention.

Referring to FIG. 7, in the servo valve, a hollow input shaft 40 connecting with a steering wheel and an output shaft 41 connecting with a steering mechanism are coaxially connected to each other through a torsion bar 42 inserted into the input shaft 40. Both the shafts 40 and 41 are rotatably supported inside a housing 43.

A cylindrical valve body 44 held inside the housing 43 is engaged with a connecting end of the output shaft 41, and a valve spool 45 is fitted relatively rotatably to the inside of the valve body 44. The valve spool 45 is formed integrally with the outer periphery of the input shaft 40.

An upper end of the input shaft 40 projects by a predetermined amount upward from the housing 43, and the projected upper end is connected to a steering wheel (not shown).

A rack housing 46 is connected to a lower part of the housing 43 so as to cross each other, and a rack shaft 47 is slidably supported in the axial direction inside the rack housing 46. The rack shaft 47 is engaged with a pinion 48 formed at a lower end of the output shaft 41.

When the steering wheel is rotated, the rotation is transmitted to the output shaft 41 through the input shaft 40 and the torsion bar 42, and is converted into a sliding (linear) motion along the axial length of the rack shaft 47 which is engaged with the pinion 48 in the output shaft 41, so that steering is done. At this time, relative angular displacement corresponding to steering torque applied to the steering wheel occurs with the twist of the torsion bar 42 between the input shaft 40 and the output shaft 41.

The torsion bar 42 connecting the input shaft 40 and the output shaft 41 has a main body portion 49. The outer diameter and the length of the main body portion 49 are determined in predetermined amounts in order to obtain desired torsional properties. Further, the torsion bar 42 has connecting portions 50 and 51, having slightly larger diameters than that of the main body portion 49, on both sides of the main body portion 49. The connecting portions 50 and 51 constitute opposite ends of the torsion bar 42.

The one connecting portion 50 is fitted to a connecting hole 52 projected located on an upper end of the output shaft 41. Serrations formed on respective fitted surfaces of the connecting portion 50 and the connecting hole 52 are engaged with each other, so that the rotation of the connecting portion 50 around the axis of the output shaft 41 is constrained.

The other connecting portion 51 is fitted to an end of the hollow input shaft 40 which projects outward from the housing 43. The rotation of the connecting portion 51 around the axis of the input shaft 40 and the axial movement of the connecting portion 51 are constrained by a knock pin 53 which penetrates the end of the input shaft 40 and the connecting portion 51 in the axial direction.

A lower end of the input shaft 40 is supported on the inside of a cylindrical portion 54 provided at an upper end of the output shaft 41. A dowel pin 56 driven into the cylindrical portion 54 is engaged with a notched groove 55 formed on a lower end surface of the valve body 44, whereby the valve body 44 is constrained in the circumferential direction.

Furthermore, an upper end surface of the valve body 44 is abutted against a snap ring 57 fitted in an outer peripheral groove of the input shaft 40, so that the valve body 44 is constrained in the axial direction. Consequently, the valve body 44 is rotated integrally with the output shaft 41 while maintaining the axial position with respect to the valve spool 45.

A plurality of oil grooves extending in the axial direction are respectively provided at approximately equal intervals in the circumferential direction on an inner peripheral surface of the valve body 44 and an outer peripheral surface of the valve spool 45. The oil grooves in the valve body 44 and the oil grooves in the valve spool 45 are alternately arranged in the circumferential direction. A plurality of restrictions whose areas vary depending on relative angular displacement between the input and output shafts are formed between the adjacent oil grooves.

A hydraulic pump 58 serving as an oil feed source communicates with any one of the above-mentioned oil grooves (oil feed groves) through a pump port 59 which penetrates the housing 43 and through an oil feed hole which penetrates the valve body 44. Oil grooves (distribution grooves) provided adjacent to both sides of the oil grooves respectively communicate, through different oil feed holes which penetrate the valve body 44 and through different cylinder ports 60 and 61 which penetrate the housing 43 with both cylinder chambers 62 and 63 of a power cylinder serving as the destination of the oil.

Furthermore, oil grooves (oil discharge grooves) adjacent to the other sides of the distribution grooves communicate with a discharge oil chamber 64 formed on one side of the valve body 44 through a hollow part of the input shaft 40, and communicate with an oil tank 66 serving as the destination of discharge of oil through a tank port 65 penetrating the housing 43 in the corresponding position of the oil discharge chamber 64.

A plurality of restrictions arranged on the circumference of a fitted surface between the valve body 44 and the valve spool 45 are subjected to initial adjustment (centering) so as to have an equal area in a neutral state where the torsion bar 42 is not twisted. Pressure oil fed into the oil feed groove through the pump port 59 from the hydraulic pump 58 in the neutral state is equally introduced into the distribution grooves adjacent to both sides of the oil feed groove, is further introduced into the oil discharge grooves adjacent to the other sides of the distribution grooves, and is discharged into the oil tank 66 through the hollow part of the input shaft 40, the oil discharge chamber 64, and the tank port 65. At this time, no pressure difference occurs between the cylinder chambers 62 and 63 respectively communicating with the distribution grooves, and the power cylinder produces no force.

On the other hand, when torque for steering (steering torque) is applied to the steering wheel, relative angular displacement occurs in the direction of the steering torque with the twist of the torsion bar 42 between the input shaft 40 and the output shaft 41, that is, between the valve spool 45 and the valve body 44, so that the areas of the restrictions arranged on the circumference of the fitted surface therebetween vary.

At this time, pressure oil fed into the oil feed groove is mainly introduced into one of the distribution grooves through the restriction whose area is increased, so that a pressure difference occurs between the one cylinder chamber 62 (or 63) communicating with each of the distribution grooves through the cylinder port 60 (or 61) and the other cylinder chamber 63 (or 62) communicating with the other distribution groove through the cylinder port 61 (or 60), and the power cylinder produces oil pressure corresponding to the pressure difference.

Hydraulic oil is squeezed from the other cylinder chamber 63 (or 62), is returned to the other distribution groove through the corresponding cylinder port 61 (or 60), is introduced into the oil discharge groove through the restriction whose area is increased on one side of the distribution groove, and is discharged into the oil tank 66 through the hollow part of the input shaft 40, the oil discharge chamber 64, and the tank port 65.

The above-mentioned power cylinder is formed in a halfway part of the rack shaft 47, and the oil pressure produced as described above by the power cylinder is applied as an axial sliding force to the rack shaft 47 which is engaged with the pinion 48, so that the steering is assisted. The direction of an auxiliary force obtained at this time corresponds to the direction of the relative angular displacement between the valve body 44 and the valve spool 45 which is produced with the twist of the torsion bar 42, and the magnitude of the auxiliary force corresponds to the magnitude of the relative angular displacement.

Figure 8:
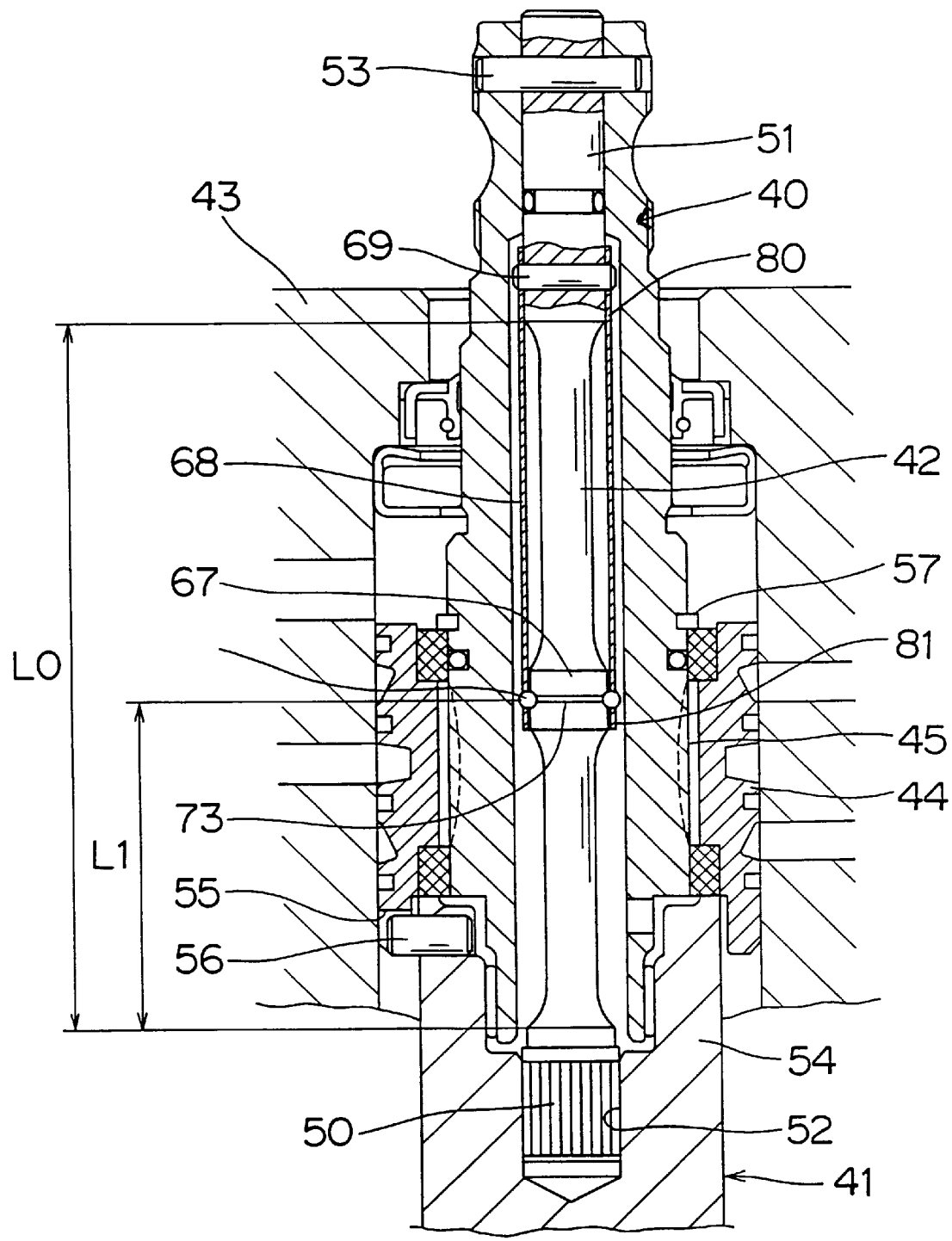
FIG. 8 is an enlarged view of the vicinity of a connecting portion between an input shaft and an output shaft.

The servo valve according to the present embodiment is characterized by the construction of the torsion bar 42, as also shown in FIG. 7. Referring to FIG. 8, which is an enlarged view of the vicinity of the connecting portion between the input shaft 40 and the output shaft 41, the connecting portion 51 which is one end of the torsion bar 42 is extended over a suitable length downward (toward the output shaft 41) from a fitted part to the input shaft 40. An engaging portion 67 serving as an intermediate part having a slightly smaller diameter than that of the connecting portion 51 is provided in an approximately central part between the connecting portion 51 and the other connecting portion 50. An outer cylinder 68 serving as a sleeve member is fitted to the outside of the torsion bar 42 in such a manner as to be stretched between the connecting portion 51 and the engaging portion 67.

The outer cylinder 68 is a cylinder having an approximately equal diameter over its entire length. A first end 80 of the outer cylinder 68 (an upper end in FIG. 8) is forced into a lower half part of the connecting portion 51 excluding the fitted part to the input shaft 40, and is fixed upon being constrained in the circumferential direction and the axial direction by the knock pin 69 driven into this position.

On the other hand, a second end 81 (a lower end in FIG. 8) of the outer cylinder 68 is opposite to an outer peripheral surface of the engaging portion 67 having a smaller diameter than that of the connecting portion 51 with a predetermined clearance therebetween. Balls 70 serving as a pair of holding means are held in positions opposite to each other in the radial direction in a portion inside the second end 81 of the outer cylinder 68. The balls 70 are respectively engaged with recesses 71 (see FIGS. 9, 10A and 10B) which are provided in a position opposite thereto to serve as different engaging portions formed on the outer peripheral surface of the engaging portion 67.

Figure 9:
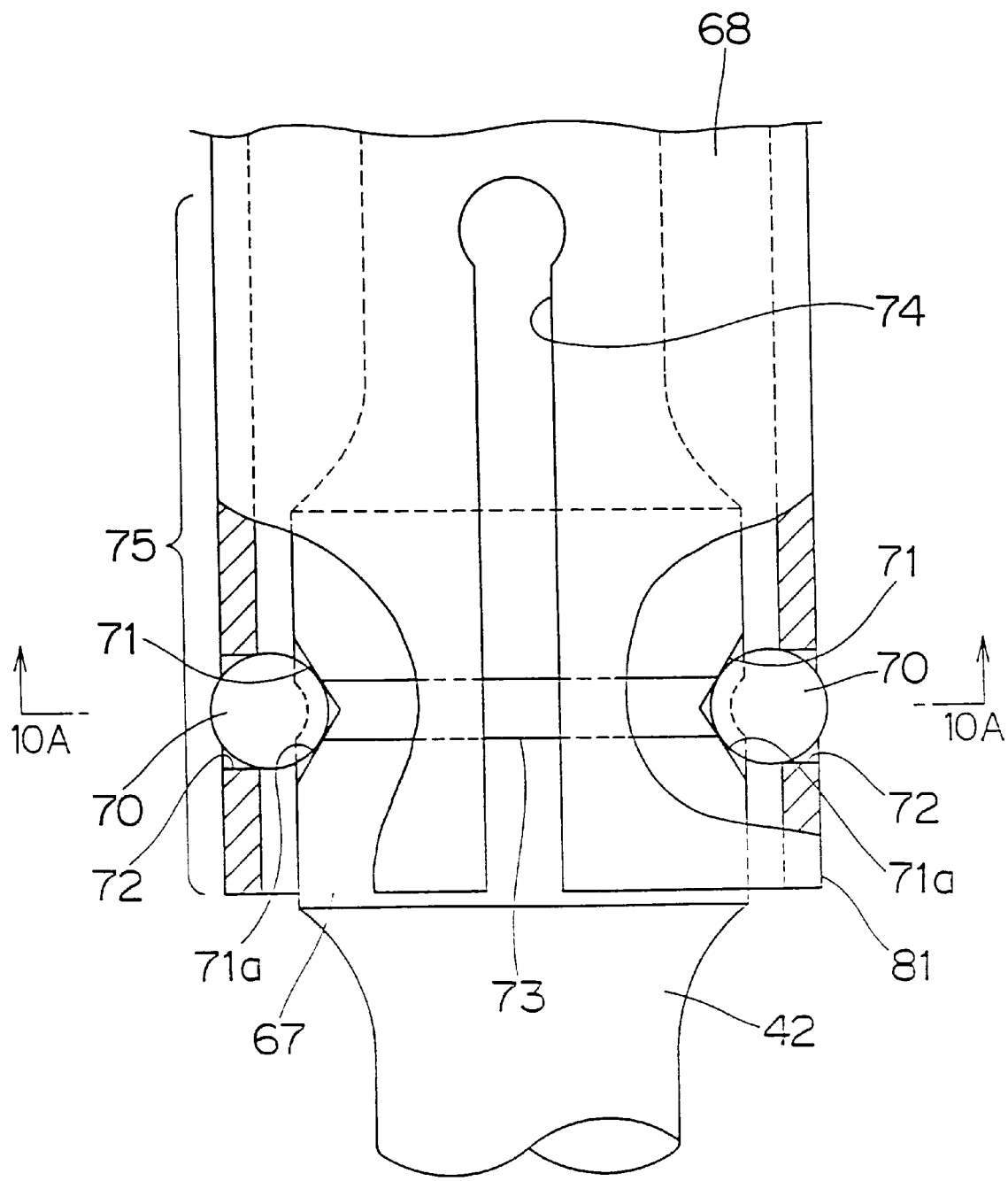
FIG. 9 is a partially sectional side view of a principal part of a torsion bar and a sleeve for explaining a state where the torsion bar is held by balls.
Figure 10A:
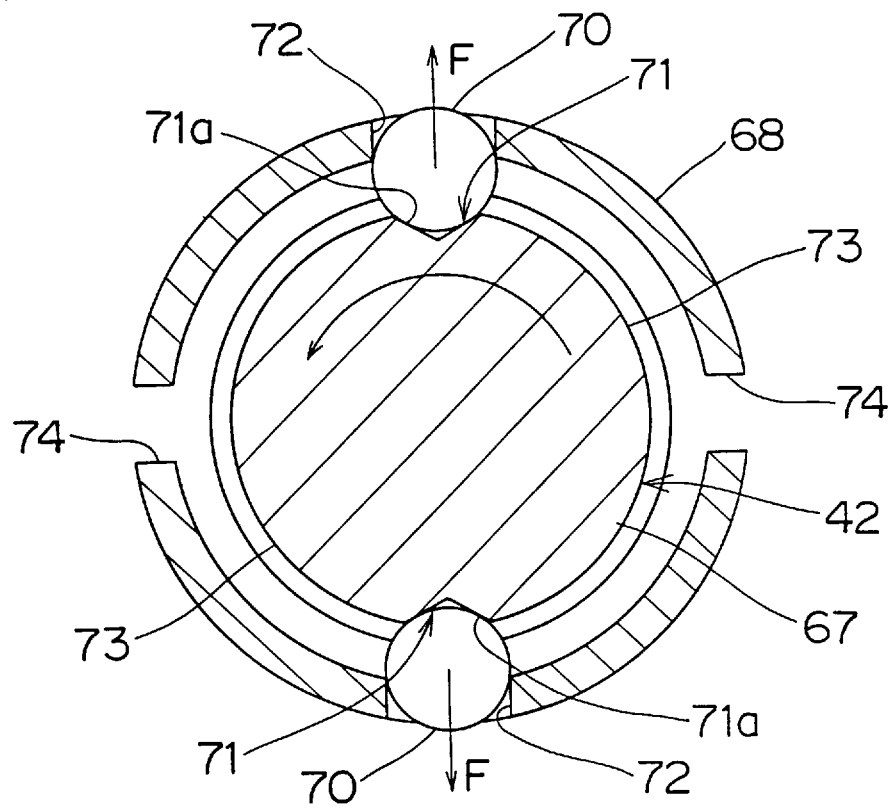
FIGS. 10A and 10B are cross-sectional views taken along a line 10A—10A shown in FIG. 9.
Figure 10B:
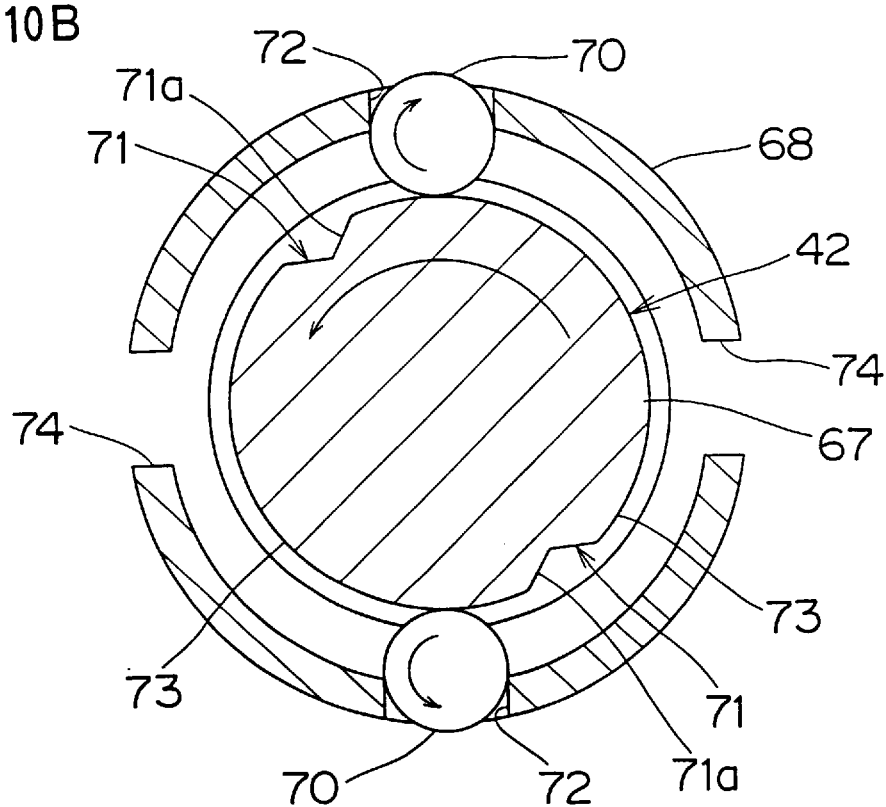

Referring to FIGS. 9, 10A and 10B, respective parts of the balls 70 are fitted to holding holes 72, which are circular in cross section, penetrating the peripheral wall of the outer cylinder 68 in the axial direction, as shown, so that the balls 70 are held in the outer cylinder 68 in a state where the movements of the balls 70 along the circumference and the axis of the outer cylinder 68 and the outward extraction of the balls 70 are constrained, and the rotation of the balls 70 themselves is allowed.

Furthermore, a shallow peripheral groove 73 having a circular arc shape in cross section is formed over the whole periphery in a position opposite to the balls 70 on the outer peripheral surface of the engaging portion 67. The recesses 71 are formed as recesses in a conical shape deeper than the peripheral groove 73 in positions opposite to each other along the radius of the peripheral groove 73, and respectively include cam surfaces 71a composed of conical surfaces.

A pair of slits 74 (only one of them is illustrated in FIG. 9) extending in the axial direction from an end surface of the second end 81 of the outer cylinder 68 and opposite to each other in the radial direction are formed upon being notched opposite to each other along the radius of the outer cylinder 68. The direction in which the paired slits 74 are opposite to each other and the direction in which the paired holding holes 72 are opposite to each other are perpendicular to each other. The slits 74 extend upward along the axis of the outer cylinder 68 beyond the positions where the holding holes 72 are formed.

A spring portion 75 having elasticity along the radius of the outer cylinder 68 is constituted by regions where the notched grooves 74 are formed. The diameter of the spring portion 75 can be enlarged by enlarging the opening width of the notched grooves 74 when a force to press the balls 70 outward is applied.

The spring portion 75 is formed in the outer cylinder 68 itself serving as a sleeve member, whereby the construction can be simplified as compared with a case where a spring portion is provided separately from an outer cylinder. Further, the spring properties of the spring portion 75 can be adjusted by the length of the slits 74.

The fixing of the upper end of the outer cylinder 68 by the knock pin 69 is achieved by aligning the positions where the balls 70 are held and the positions where the recesses 71 which are formed on the outer periphery of the engaging portion 67 in the circumferential direction, as shown in FIG. 10A, in a neutral state where the torsion bar 42 is not twisted. Consequently, projected parts of the balls 70 toward the inside of the outer cylinder 68 are respectively engaged with the recesses 71, and are pressed by the elasticity of the spring portion 75, to hold the engaging portion 67 serving as an intermediate part in the axial direction of the torsion bar 42 from the outside.

The outer cylinder 68 has the function of constraining the twist of an upper half part of the torsion bar 42 (between the connecting portion 51 at the upper end and the engaging portion 67). The twist of the torsion bar 42 in this state is produced with the length of its lower half part (between the engaging portion 67 and the connecting portion 51 at the lower end) taken as an effective length (=L1, see FIG. 8). Since the outer cylinder 68 is not rigid with respect to a torsional force, the actual twist is also slightly produced in the upper half part of the torsion bar 42 which is constrained by the outer cylinder 68.

The torsional force thus applied to the torsion bar 42 is exerted on the cam surfaces 71a of the recesses 71 as a force perpendicular thereto from the balls 70. The balls 70 are pressed outward in the radial direction by a component F of the exerted force. The component F of the force increases as the torsional force increases. On the other hand, the balls 70 engaged with the recesses 71 are urged inward by the elasticity of the spring portion 75. However, its urging force is constant.

When the torsional force applied to the torsion bar 42 increases, and the component F of the force is above the inward pressing force, therefore, the balls 70 move outward in the radial direction with the increase in the diameter of the spring portion 75 caused by the increase in the widths of the notched grooves 74, and are extracted from the recesses 71, as shown in FIG. 10B, to run onto the peripheral groove 73 connecting therewith, after which the balls 70 are movable in the circumferential direction along the peripheral groove 73.

The balls 70 are rotatably held in the different holding holes 72 formed in the outer cylinder 68. The balls 70 extracted from the recesses 71 move without meeting with any resistance by the rotation on the peripheral groove 73. The twist of the torsion bar 42 in this state is produced with the length of a portion between the upper and lower connecting portions 50 and 51, that is, with approximately the entire length of the torsion bar 42 taken as an effective length (=L0, see FIG. 8).

The twist of the torsion bar 42 is thus produced with its approximately half length (=L1) taken as an effective length while the torsional torque applied thereto reaches a predetermined level, specifically while the component F of the force applied as described above to the balls 70 is below the urging force of the spring portion 75, while being produced with its entire length (=L0) taken as an effective length when the torsional torque exceeding the predetermined level is applied.

Consequently, the relative angular displacement between the input shaft 40 and the output shaft 41 which are connected to each other through the torsion bar 42 (or between the valve spool 45 and the valve body 44) gradually increases as the steering torque applied to the input shaft 40 increases while the steering torque reaches the predetermined level, and rapidly increases when it reaches the predetermined level. As a result, the auxiliary steering force produced by the power cylinder depending on the relative angular displacement gradually increases in a region where the steering torque is low, while rapidly increasing in a region where the steering torque is high.

FIG. 11 is a graph showing one example of the characteristics of an auxiliary force obtained in the power assisted steering gear comprising an hydraulic pressure control valve according to the present embodiment. A broken line and a one-dot and dash line in FIG. 11 respectively indicate the characteristics obtained in a case where the effective length of the torsion bar 42 is L1 and the characteristics obtained in a case where the effective length of the torsion bar 42 is L0. In the power assisted steering gear comprising the hydraulic pressure control valve according to the present embodiment, when the absolute amount of the steering torque applied to the steering wheel is small, the auxiliary steering force produced by the power cylinder gradually increases along the broken line, while rapidly increasing at the same rate of change as that in the characteristics indicated by the one-dot and dash line when the steering torque exceeds a predetermined value, that is, steering torque T1 which is sufficient to release the holding of an intermediate part in the axial direction of the torsion bar 42 by the balls 70.

Consequently, at the time of small steering when the steering torque applied to the steering wheel is low as a whole, the power cylinder hardly assists steering, whereby suitable rigidity is given to the steering wheel. Particularly, it is possible to improve straight stability during high-speed traveling.

On the other hand, at the time of large steering, the steering torque exceeding T1 is given to the steering wheel, so that the power cylinder produces a large auxiliary steering force, whereby the labor burden on a driver can be effectively reduced. Such characteristics of the auxiliary force are realized by mounting the outer cylinder 68 on the torsion bar 42, whereby no additional construction to other components such as the input shaft 40, the output shaft 41 and the housing 43 is required, and characteristics of the auxiliary force adapted to the traveling state are obtained by simple construction.

Since the balls 70 are used as holding means, the balls 70 move in the circumferential direction after being extracted from the recesses 71 on the outer periphery of the torsion bar 42 without meeting with any resistance by being rotated on the peripheral groove 73. As a result, the relative angular displacement between the input shaft 40 and the output shaft 41 may not be affected.

Although in the fourth embodiment, the balls are used as the holding means, a projection provided integrally with the inside of the outer cylinder 68 can be also used as holding means in place of the balls.

Figure 12A:
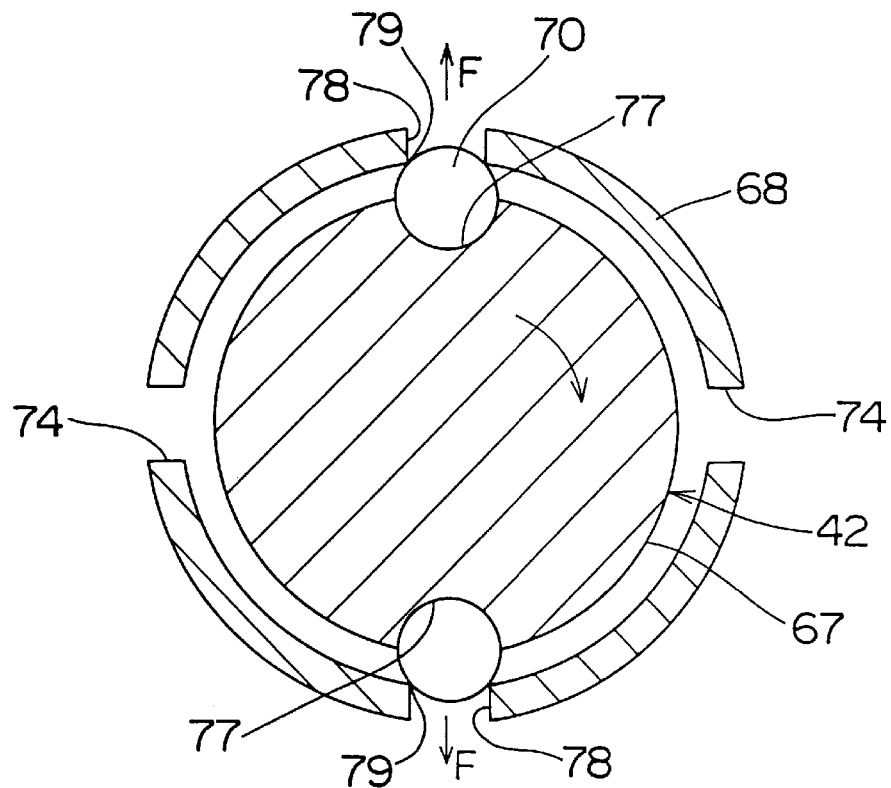
FIGS. 12A and 12B are cross-sectional views of a principal part of a servo valve according to a fifth embodiment.
Figure 12B:
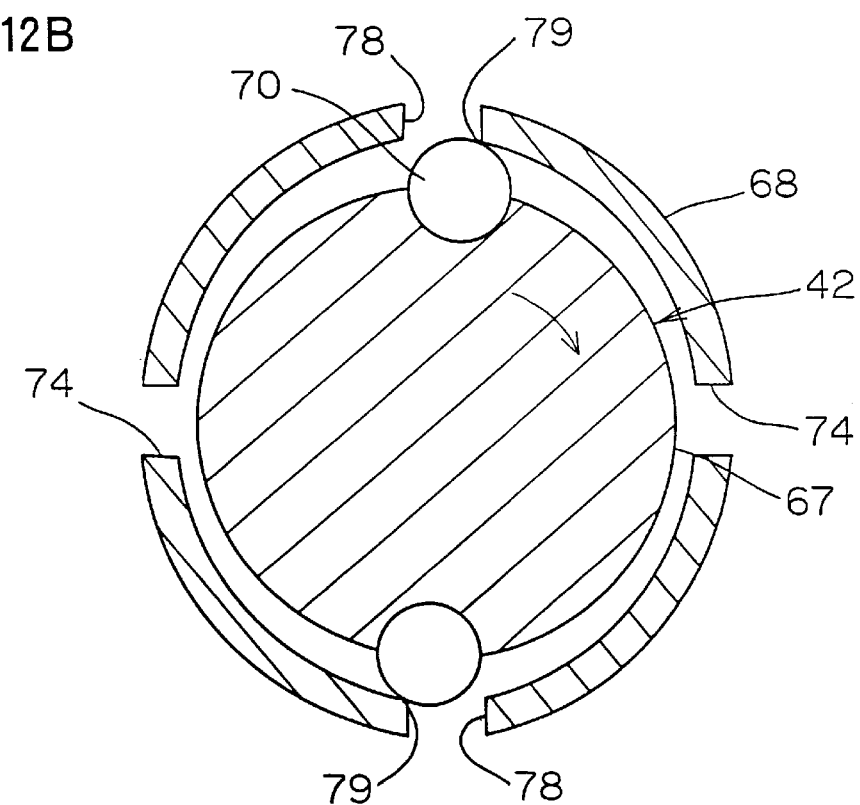

FIGS. 12A and 12B illustrate a fifth embodiment which is a modified example of the fourth embodiment of the present invention. FIGS. 12A and 12B respectively correspond to FIGS. 10A and 10B.

In the above-mentioned fourth embodiment, the balls 70 are held in the holding holes 72 in the outer cylinder 68 to constitute the holding means. Contrary to this, in the fifth embodiment, balls 70 are held upon being fitted in respective recesses 77 on the outer periphery of a torsion bar 42 and being prevented from removing from the recesses 77. On the other hand, a pair of openings for engagement 78 opposite to each other in the radial direction are formed upon penetrating the outer cylinder 68 so that the balls 70 held in the torsion bar 42 are held by respective edges 79 serving as engaging portions of the openings 78 so as to be allowed to remove from the respective openings 78. In the present embodiment, therefore, the holding means is constituted by the edges 79 of the openings 78 in the outer cylinder 68.

Also in the present embodiment, the same function and effect as those in the fourth embodiment are produced. The ball 70 may be held in the recess 77 in a rotatable state, or may be held in the recess 77 by regulating the rotation. Further, a conical cam surface for urging the ball 70 toward the center of the opening 78 may be formed at the edge 79 of the opening 78.

In the fifth embodiment, the ball 70 can be also replaced with a projection provided integrally with the outer periphery of the torsion bar 42.

Although in the fourth and fifth embodiments, the outer cylinder 68 is mounted so as to stretch between both the connecting portion 51 on the side of the input shaft 40 of the torsion bar 42 and the engaging portion 67 in an approximately central part in the axial direction of the torsion bar 42 with an end on the side of the connecting portion 51 taken as a fixed end, the outer cylinder 68 may be mounted with an end on the side of the engaging portion 67 taken as a fixed end. Further, the outer cylinder 68 may be mounted on the other portion on the outer periphery of the torsion bar 42, for example, mounted upon stretching between both the connecting portion 50 on the side of the output shaft 41 and the engaging portion 67.

Although in the fourth and fifth embodiments, the spring portion 75 of the outer cylinder 68 is constructed integrally with the outer cylinder 68 by forming the slits 74, the spring portion can be also constituted by other means. For example, an annular spring member may be wound around the outer cylinder 68, thereby urging the holding means (for example, a ball) inward to construct a spring portion.

Furthermore, although in the above-mentioned embodiments, description was made of an example in which the present invention is applied to the power assisted steering gear of a rack-and-pinion type, the applicability of the present invention is not limited to the same. For example, the present invention is also applicable to a power assisted steering gear of the other types such as a ball screw type, by which the same effect is assuredly obtained.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. The servo valve for a power assisted steering gear, comprising:

an input member;

an output member;

a torsion bar having opposite ends respectively connected to the input member and the output member, said torsion bar having a plunger-containing hole formed in a radial direction of the torsion bar and in an intermediate part of the torsion bar between opposite ends of the torsion bar;

a sleeve member surrounding the torsion bar and having first and second ends, the sleeve member being provided with an opening which penetrates the second end thereof in a radial direction of the sleeve member, an edge of the opening constituting means for holding the intermediate part of the torsion bar so as to increase an effective torsional rigidity of the torsion bar in a predetermined torsional angle range of the torsion bar;

a plunger contained in the plunger-containing hole and being movable in a radial direction of the torsion bar and elastically engaged with the edge of the opening;

a spring member for urging the plunger in a radially outward direction of the torsion bar; and means for preventing the first end of the sleeve member from being rotated with respect to the torsion bar.

2. The servo valve for the power assisted steering gear according to claim 1, wherein the plunger is in the shape of a cylinder having an apex engaged with the edge of the opening, at least a part of the spring member being inserted thereinto.

3. The servo valve for the power auxiliary steering gear according to claim 1, wherein the plunger has predetermined elasticity.

4. The servo valve for the power auxiliary steering gear according to claim 1, wherein said intermediate part of said torsion bar separates a first part of said torsion bar from a second part of said torsion bar, each of said first part and said second part being subjectable to torsional twisting; wherein said second end of said sleeve member is selectively engageable with said intermediate part using said means for holding so that said sleeve member restricts the torsional twisting of the first part while allowing the second part to be subjected to the torsional twisting; and wherein said second end of said sleeve member is selectively disengageable with said intermediate part so that said sleeve member does not significantly restrict the torsional twisting of the first part, thereby allowing both the first part and the second part to be subjected to the torsional twisting.

5. The servo valve for the power auxiliary steering gear according to claim 4, wherein said intermediate part has a diameter that is greater than a diameter of the first part and a diameter of the second part.

6. The servo valve for the power auxiliary steering gear according to claim 5, wherein the first part and the second part are disposed between the opposite ends of said torsion bar.

7. A servo valve for a power assisted steering gear, comprising:

an input member;

an output member;

a torsion bar having opposite ends respectively connected to the input member and the output member, said torsion bar having a plunger-containing hole formed in a radial direction of the torsion bar and in an intermediate part of the torsion bar between opposite ends of the torsion bar;

a sleeve member surrounding the torsion bar and having first and second ends, the sleeve member being provided with an opening which penetrates the second end thereof in a radial direction of the sleeve member, an edge of the opening constituting means for holding the intermediate part of the torsion bar so as to increase an effective torsional rigidity of the torsion bar in a predetermined torsional angle range of the torsion bar;

a plunger contained in the plunger-containing hole and being movable in a radial direction of the torsion bar and elastically engaged with the edge of the opening; and means for preventing the first end of the sleeve member from being rotated with respect to the torsion bar wherein the opening has such dimensions as to prevent the plunger from being extracted from the plunger-containing hole.

8. The servo valve for the power assisted steering gear according to claim 7, wherein the plunger has predetermined elasticity.

9. The servo valve for the power auxiliary steering gear according to claim 7, wherein said intermediate part of said torsion bar separates a first part of said torsion bar from a second part of said torsion bar, each of said first part and said second part being subjectable to torsional twisting; wherein said second end of said sleeve member is selectively engageable with said intermediate part using said means for holding so that said sleeve member restricts the torsional twisting of the first part while allowing the second part to be subjected to the torsional twisting; and wherein said second end of said sleeve member is selectively disengageable with said intermediate part so that said sleeve member does not significantly restrict the torsional twisting of the first part, thereby allowing both the first part and the second part to be subjected to the torsional twisting.

10. The servo valve for the power auxiliary steering gear according to claim 9, wherein said intermediate part has a diameter that is greater than a diameter of the first part and a diameter of the second part.

11. The servo valve for the power auxiliary steering gear according to claim 10, wherein the first part and the second part are disposed between the opposite ends of said torsion bar.

12. A servo valve for a power assisted steering gear, comprising:

an input member;

an output member;

a torsion bar having opposite ends respectively connected to the input member and the output member, and having an intermediate part disposed between the opposite ends of the torsion bar, said torsion bar further having a plunger-containing hole which penetrates the intermediate part of the torsion bar in a radial direction of the torsion bar;

a sleeve member surrounding the torsion bar and having first and second ends, the second end of the sleeve member being provided with a pair of openings formed opposite to each other in a radial direction of the sleeve member, said pair of openings having edges that constitute means for holding the intermediate part of the torsion bar so as to increase an effective torsional rigidity of the torsion bar in a predetermined torsional angle range of the torsion bar;

a pair of plungers contained in the plunger-containing hole and being movable in the radial direction of the torsion bar and respectively elastically engaged with the edges of the pair of openings;

a spring member interposed between the pair of plungers for urging the plungers in opposite directions; and means for preventing the first end of the sleeve member from being rotated with respect to the torsion bar.

13. The servo valve for the power auxiliary steering gear according to claim 12, wherein the plunger has predetermined elasticity.

14. The servo valve for the power auxiliary steering gear according to claim 12, wherein said intermediate part of said torsion bar separates a first part of said torsion bar from a second part of said torsion bar, each of said first part and said second part being subjectable to torsional twisting; wherein said second end of said sleeve member is selectively engageable with said intermediate part using said means for holding so that said sleeve member restricts the torsional twisting of the first part while allowing the second part to be subjected to the torsional twisting; and wherein said second end of said sleeve member is selectively disengageable with said intermediate part so that said sleeve member does not significantly restrict the torsional twisting of the first part, thereby allowing both the first part and the second part to be subjected to the torsional twisting.

15. The servo valve for the power auxiliary steering gear according to claim 14, wherein said intermediate part has a diameter that is greater than a diameter of the first part and a diameter of the second part.

16. The servo valve for the power auxiliary steering gear according to claim 15, wherein the first part and the second part are disposed between the opposite ends of said torsion bar.

17. A servo valve for a power assisted steering gear, comprising:

an input member;

an output member;

a torsion bar having opposite ends respectively connected to the input member and the output member;

a sleeve member surrounding the torsion bar and having first and second ends, the second end of the sleeve member being provided with means for holding an intermediate part of the torsion bar disposed between the opposite ends of the torsion bar so as to increase an effective torsional rigidity of the torsion bar in a predetermined torsional angle range of the torsion bar;

means for preventing the first end of the sleeve member from being rotated with respect to the torsion bar;

a pair of openings which penetrate the second end of the sleeve member in a radial direction of the sleeve member and spaced apart from each other along an axis of the sleeve member;

a pair of plunger-containing holes formed along the radius of the torsion bar in the intermediate part between the opposite ends of the torsion bar and spaced apart from each other along an axis of the torsion bar;

a pair of plungers respectively contained in the plunger-containing holes and being movable in a radial direction of the torsion bar and elastically engaged with edges of the pair of openings; and a pair of spring members for respectively urging the plungers in opposite directions; wherein the holding means includes the edges of the pair of openings.

18. The servo valve for the power auxiliary steering gear according to claim 17, wherein said intermediate part of said torsion bar separates a first part of said torsion bar from a second part of said torsion bar, each of said first part and said second part being subjectable to torsional twisting; wherein said second end of said sleeve member is selectively engageable with said intermediate part using said means for holding so that said sleeve member restricts the torsional twisting of the first part while allowing the second part to be subjected to the torsional twisting; and wherein said second end of said sleeve member is selectively disengageable with said intermediate part so that said sleeve member does not significantly restrict the torsional twisting of the first part, thereby allowing both the first part and the second part to be subjected to the torsional twisting.

19. The servo valve for the power auxiliary steering gear according to claim 18, wherein said intermediate part has a diameter that is greater than a diameter of the first part and a diameter of the second part.

20. The servo valve for the power auxiliary steering gear according to claim 19, wherein the first part and the second part are disposed between the opposite ends of said torsion bar.

* * * * *